United States Patent [19]
Hall et al.

[11] Patent Number: 5,214,532
[45] Date of Patent: May 25, 1993

[54] AFOCAL OBJECTIVE LENS

[75] Inventors: John M. Hall; Robert A. Spande, both of Alexandria, Va.

[73] Assignee: The United States of America as represented by the Secretary of the Army, Washington, D.C.

[21] Appl. No.: 875,490

[22] Filed: Apr. 29, 1992

[51] Int. Cl.⁵ ..................... G02B 13/14; G02B 15/12
[52] U.S. Cl. .................................... 359/356; 359/357; 359/673; 359/828; 359/829
[58] Field of Search ............... 359/355, 356, 357, 673, 359/818, 827, 828, 829

[56] References Cited

U.S. PATENT DOCUMENTS

| | | | |
|---|---|---|---|
| 3,368,078 | 2/1968 | Flint et al. | 359/356 |
| 3,778,133 | 11/1973 | Tatian | 359/356 |
| 4,380,363 | 4/1983 | Fjeldsted | 359/357 |
| 4,397,520 | 8/1983 | Neil | 359/357 |
| 4,505,535 | 3/1985 | Neil | 359/357 |
| 4,695,119 | 9/1987 | Neil | 359/357 |
| 4,834,472 | 5/1989 | Palmer | 359/356 |
| 5,024,493 | 6/1991 | Fantozzi et al. | 359/356 |

Primary Examiner—Martin Lerner
Attorney, Agent, or Firm—Milton W. Lee; John E. Holford; Anthony T. Lane

[57] ABSTRACT

An accessory lens for a far-infrared thermal imager which is quickly installed or removed to double the range. The accessory uses two or three element with alternating dielectric constants and combinations of spherical and aspherical surfaces.

8 Claims, 2 Drawing Sheets

AFOCAL OBJECTIVE LENS

BACKGROUND OF THE INVENTION

1. Field of the Invention

Accessories for infrared night vision surveillance devices, particularly lens configurations for such devices.

2. Description of Related Art

In the past, a number of very successful night viewing surveillance devices have been developed for use by the U.S. Army, one good example is the AN/TAS-6 (NODLR) Forward Looking Infrared (FLIR) imager. This type of imager has been designed for a maximum range of about 3,000 meters, but recent maneuvers in the Saudi-Arabian desert have indicated that this type of terrain affords unobscured operation to about twice that range.

The primary object of the present invention is to provide a means for extending the range of these imagers or viewers.

SUMMARY OF THE INVENTION

The invention disclosed herein is directed to a lens accessory with a quick-disconnect provision to engage the front end of the infrared viewer, which temporarily doubles the normal range with nearly diffraction limited optical performance.

BRIEF DESCRIPTION OF THE DRAWINGS

The invention is best understood with reference to the attached drawings, wherein.

PREFERRED EMBODIMENTS

As a result of recent experiences in the deserts of the middle east, it was discovered that, under good viewing conditions, the range of current infrared viewers might be usefully extended to twice their normal range. These viewers were being used up to their maximum range capability; while similar visible light surveillance devices were found to be useful, under daylight conditions, to about twice that range. These viewers have a housing structure at the front end which provides a snap-on capability for accessories such as filters, polarizers, image-splitters, etc. The viewer uses a 4.5 inch objective lens to achieve its 3,000 meter range, this lens remains in place when using the invention to be described.

Figure 1:
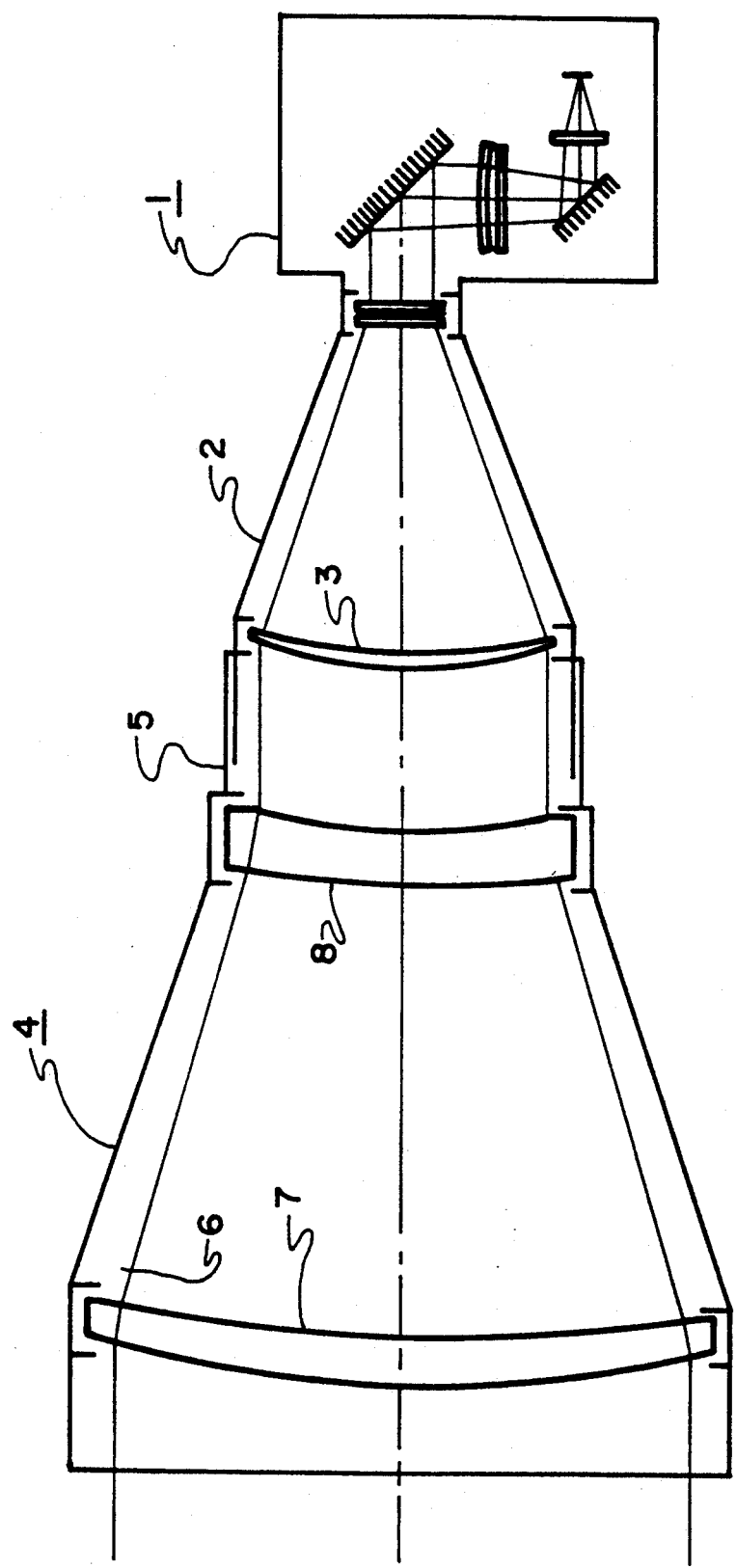
FIG. 1 shows a first embodiment of the lens accessory employing two lens elements.

As shown in FIG. 1 the present invention is designed to work with an imager 1 encased in a housing with a flared portion 2 defining an optical chamber for an objective lens 3. The invention provides a lens accessory 4 encased in a flared housing with large and small diameter ends. The small end 5 is designed to slip over or thread onto the open end of the flared housing portion on the imager. Alternatively the small end and open end may form a bayonet structure as used in many cameras. Still another method is to add an external clamp ring similar to an automotive hose line clamp, preferably permanently attaching part of the clamp to the accessory housing. The large end of the accessory housing is more than twice the diameter of the large end of the portion of the imager to increase substantially the light gathering area.

The optics in the lens accessory may consist of two aspherically ground elements 7 and 8. The elements are preferably formed of germanium. Lens 7 has an overall diameter of 10 inches and lens 8 a diameter of 5 inches.

Table I shows the parameters used in grinding these lenses. On each lens the front or left surface, as shown, is ground spherical and the back or right surface is ground aspherical. The lenses are mounted in metal or plastic frames 6 which are designed to firmly engage the inner wall of the accessory housing. The frames initially slide into position and then are cemented in place, according to well known practices in the optical art. The spacing between lenses 7 and 8 on the optic axis is 6.917 inches and the same spacing between lenses 8 and 3 is 2.500 inches. The housing may have over lapping threaded portions with lengths corresponding to the above spacings, the ends of which creates a groove that engages the frames to secure them at assembly and to make them accessible during dissassembly. The outer surface at each end of the accessory housing may be smooth or threaded or grooved to engage protective lens caps, which caps may be metal or high impact plastic. These caps protect the exposed surfaces of the lenses when the accessory is not in active use.

Grinding the aspherical surfaces requires a special machine and this machine at present requires certain standardized parameters that fit the following algorithm to define the surface curve. The algorithm is:

$$Z = \frac{(CURV)Y^2}{1 + (1 - (1 + K)(CURV)^2 Y^2)^{0.5}} + (A)Y^4 + (B)Y^6 + (C)Y^8 + (D)Y^{10}$$

where Z is the depth of cut, Y is the radial position of the cutter and CURV is the reciprocal of the front or back radius from Table 1.

The back surface of each lens is shaped as closely as practicable to the radius given in Table I and then aspherically shaped on a special lens lathe using a diamond cutter to correct for spherical aberration. A description of this technique, as applied to visually opaque far-infrared lenses, is found in the magazine article "Manufacturers Turn Precision Optics with Diamond" by E Ray McClure in *Laser Focus World*, published Feb. 1991, pg. 95.

TABLE I

| Surface | Material | Pupil | Thickness | Front-Radius | Back-Radius |
|---|---|---|---|---|---|
| 7 | Ge | 9.0 | .79446 | 17.87286 | 27.59132 |
| 8 | Ge | 4.5 | .82919 | 17.26827 | 9.66960 |
| Aspheric Data | | | | | |
| LENS 7 (Back) | K | 0.269961, | | A | 0.315241 E-5, |
| B −0.341433, | C | 0.174967 E-7, | | D | −0.303721 E-9 |
| LENS 8 (Back) | K | −0.071927 E-7, | | A | 0.633741 E-6, |
| B 0.104960 E-5, | C | −0.156092 E-6, | | D | −0.930702 E-8 |

Figure 2:
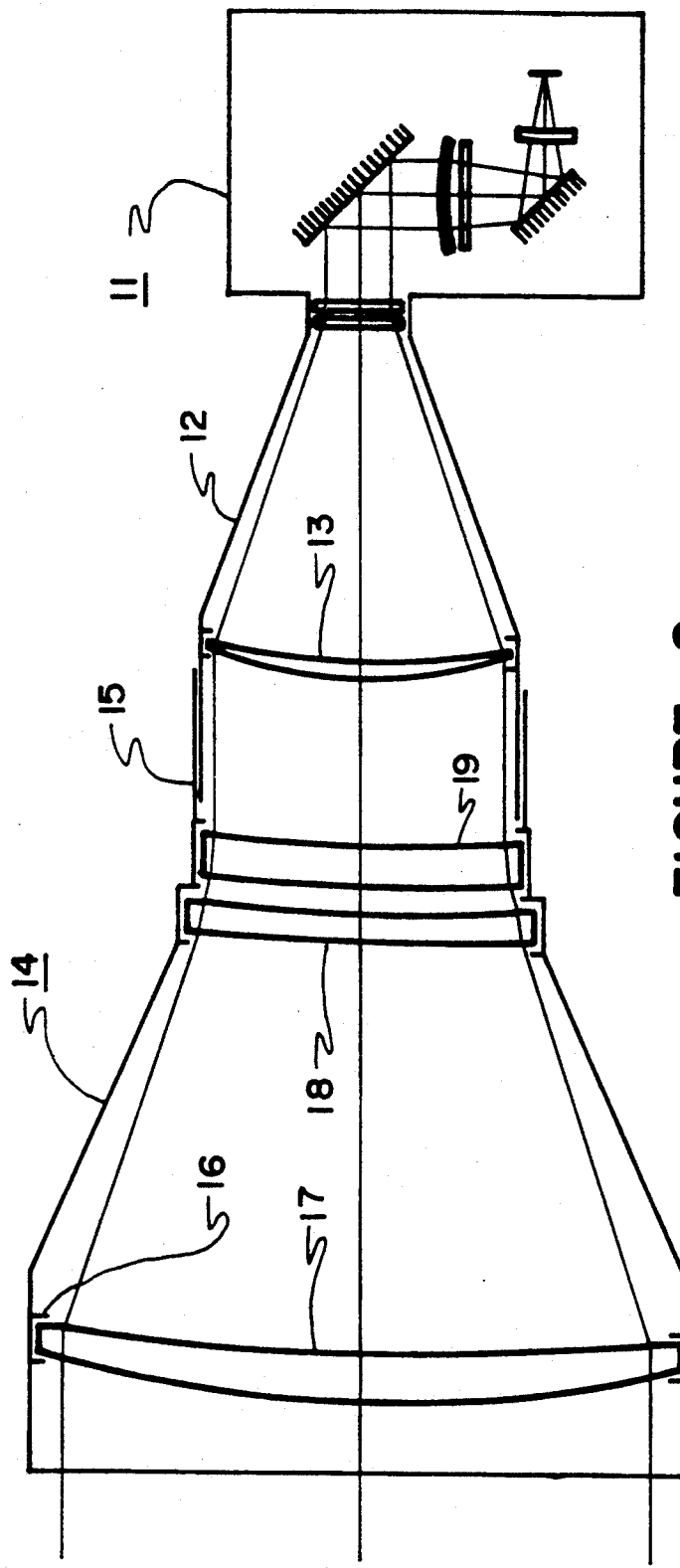
FIG. 2 shows a second embodiment of the lens accessory employing three lens elements.

FIG. 2 shows another modification of the same accessory which uses three lenses. A slightly different accessory housing with a similar overlapping portion 15 is provided to accommodate the three lenses. Frames 16 for the lenses are provided as above. Lens 17 is 10 inches in diameter, lens 18 is 5.36 inches in diameter and lens 19 is 5 inches in diameter. Table II provides the specification for these lenses. All of the lens surfaces in this modification are spherical. The front and rear lenses are made from germanium and the center lens is formed from zinc selenide to provide a correction for wavelength or chromatic aberrations. The spacing of lenses 17 and 18 is 6.148 inches, of lenses 18 and 19 is 0.421 inches and of lenses 19 and 13 is 2.500 inches.

The three lens design is much cheaper than the two lens approach due to the higher cost of cutting the aspheric curvatures on the back surfaces. The aspheres correct most of the geometrical aberrations, but the 2-element afocal is not chromatically corrected quite as well as the 3-element design. The two-lens element design offers lower light attenuation and lower weight. The surfaces of the lenses are ground to the spherical specifications provided in Table II. Input and Output pupils are given, in that order, so that the user may design and use stops at any or all of the lens surfaces as desired. A good practice is to use a stop at the last exit surface.

TABLE II

| Element | Material | Pupil | Thickness | Front-Radius | Back-Radius |
| --- | --- | --- | --- | --- | --- |
| 17 | Ge | 9.5478 | 0.6916 | 20.0042 | 36.0995 |
|    |    | 9.3915 |        |         |         |
| 18 | ZnSe | 5.1293 | 0.4161 | 40.2418 | 33.3655 |
|    |    | 4.9743 |        |         |         |
| 19 | Ge | 4.7186 | 0.5611 | 59.9198 | 16.2409 |
|    |    | 4.5681 |        |         |         |

Industrial applicability of this invention includes but is not limited to: military IR equipment, law enforcement equipment, and surveying equipment.

This preferred embodiment is not intended to restrict the invention to the precise embodiment or embodiments described.

We claim:

1. An accessory lens for a far-infrared imager with an input objective lens and a cylindrical housing portion closely surrounding said input lens, including:
   a flared cylindrical accessory housing having a small end large enough to slide over and closely engage said housing portion and an opposed large end with approximately twice the diameter of said small end;
   at least two lens elements mounted in said accessory housing, each made from a material transparent to far-infrared and each having a different dielectric constant, whereby one lens corrects chromatic aberrations caused by the other.
2. An accessory lens according to claim 1, wherein: said lens elements have substantially the same diameters as the large and small inside end diameters of said accessory housing, the large diameter element consisting of germanium and the small diameter element consisting of zinc selenide.
3. An accessory lens according to claim 2, wherein: the surface of each of said elements closest to said large end is spherical, and
   the surface of each of said elements closest to said small end is aspherical.
4. An accessory lens according to claim 1, wherein: three of said elements are mounted in said accessory housing, the elements nearest each end consisting of germanium and the centermost element consisting of zinc selenide.
5. An accessory lens according to claim 4, wherein: the surfaces of all of said elements are spherical.
6. An accessory lens according to claim 1, wherein: said accessory and said imager are held together by mating threads.
7. An accessory lens according to claim 1, wherein: said accessory and said imager are held together by a standard bayonet coupling.
8. An accessory lens according to claim 1, wherein: said accessory and said imager are held together by an external clamping ring.

* * * * *